United States Patent
Longman et al.

(10) Patent No.: US 11,205,844 B2
(45) Date of Patent: Dec. 21, 2021

(54) BEAM SKEW MITIGATION USING NON-LINEAR FREQUENCY MODULATION SIGNALS

(71) Applicant: GM GLOBAL TECHNOLOGY OPERATIONS LLC, Detroit, MI (US)

(72) Inventors: Oren Longman, Tel Aviv (IL); Igal Bilik, Rehovot (IL)

(73) Assignee: GM Global Technology Operations LLC, Detroit, MI (US)

( * ) Notice: Subject to any disclaimer, the term of this patent is extended or adjusted under 35 U.S.C. 154(b) by 378 days.

(21) Appl. No.: 16/504,959

(22) Filed: Jul. 8, 2019

(65) Prior Publication Data
US 2021/0013606 A1 Jan. 14, 2021

(51) Int. Cl.
*H01Q 3/34* (2006.01)
*H01Q 1/32* (2006.01)
*G01S 13/931* (2020.01)
*G01S 13/89* (2006.01)
*G01S 7/35* (2006.01)

(52) U.S. Cl.
CPC ............... *H01Q 3/34* (2013.01); *G01S 7/35* (2013.01); *G01S 13/89* (2013.01); *G01S 13/931* (2013.01); *H01Q 1/3233* (2013.01)

(58) Field of Classification Search
CPC . G01S 13/34–347; G01S 13/931; H01Q 3/34; G01Q 1/3233
See application file for complete search history.

(56) References Cited

U.S. PATENT DOCUMENTS

| | | | | |
|---|---|---|---|---|
| 5,719,580 A | * | 2/1998 | Core | G01S 7/4008 342/100 |
| 5,923,280 A | * | 7/1999 | Farmer | G01S 7/354 342/70 |
| 7,170,440 B1 | * | 1/2007 | Beckner | G01S 7/024 342/118 |
| 9,791,551 B1 | * | 10/2017 | Eshraghi | G01S 7/038 |
| 2007/0285315 A1 | * | 12/2007 | Davis | H01Q 3/2629 342/377 |

(Continued)

OTHER PUBLICATIONS

G. S. Krishnam Naidu Yedla et al., "Desiging a waveform using LFM, NLFM for MIMO radar", International Journal of Engineering and Technology, 7 (1.5), pp. 84-89, 2018 (Year: 2018).*

(Continued)

*Primary Examiner* — Peter M Bythrow
(74) *Attorney, Agent, or Firm* — Quinn IP Law

(57) ABSTRACT

An on-vehicle radar system is described, and includes a phased array antenna including a plurality of transmit antennas, and a corresponding plurality of transmitters, wherein each of the transmitters is in communication with a respective one of the transmit antennas. A controller is operatively connected to each of the plurality of transmitters. The controller includes an instruction set that is executable to generate a plurality of Non-Linear Frequency Modulated (NLFM) radar signals corresponding to individual ones of the plurality of transmitters. Each of the NLFM radar signals that is generated for a respective one of the transmitters is determined based upon a desired beam steering angle and a position of the respective one of the transmit antennas of the phased array antenna.

19 Claims, 3 Drawing Sheets

(56) References Cited

U.S. PATENT DOCUMENTS

| | | | |
|---|---|---|---|
| 2008/0088503 A1* | 4/2008 | Beasley | G01S 7/4056 342/200 |
| 2012/0299773 A1* | 11/2012 | Stirling-Gallacher | H01Q 3/34 342/368 |
| 2016/0025844 A1* | 1/2016 | Mckitterick | G01S 7/35 342/21 |
| 2017/0261598 A1* | 9/2017 | Kato | G01S 13/931 |
| 2019/0064336 A1* | 2/2019 | Takahashi | G01S 7/295 |
| 2019/0302253 A1* | 10/2019 | Santra | G01S 13/87 |
| 2019/0346556 A1* | 11/2019 | Wang | G01S 13/34 |
| 2020/0041611 A1* | 2/2020 | Scherz | H01Q 25/00 |
| 2021/0041550 A1* | 2/2021 | Kallfass | G01S 15/88 |
| 2021/0156982 A1* | 5/2021 | Stettiner | G01S 7/0235 |

OTHER PUBLICATIONS

Armin Doerry, "Generating Nonlinear FM CHirp Waveforms for RADAR", Sandia Report, Sandia National Laboratories, SAND2006-5856, Sep. 2006 (Year: 2006).*

* cited by examiner

BEAM SKEW MITIGATION USING NON-LINEAR FREQUENCY MODULATION SIGNALS

INTRODUCTION

On-vehicle radar systems may be employed to detect and locate other vehicles, pedestrians and fixed or moving objects when deployed on ground vehicles. A radar system may employ beam steering in phased array antennas, which may be achieved by phase shifting the signal between antenna elements. In a linear frequency modulation system (LFM), wavelength λ changes during a chirp, which causes the beam direction to vary during the LFM transmission, referred to as beam skew. Variation in frequency of an LFM transmission may induce a phase roll between antenna elements. Beam skew may limit the accuracy of direction of arrival estimation, reduce antenna gain and limit scanning capabilities. Thus, reducing, minimizing and eliminating beam skew will serve to improve accuracy and precision of a radar system.

SUMMARY

An on-vehicle radar system is described, and includes a phased array antenna including a plurality of transmit antennas, and a corresponding plurality of transmitters, wherein each of the transmitters is in communication with a respective one of the transmit antennas. A controller is operatively connected to each of the plurality of transmitters. The controller includes an instruction set that is executable to generate a plurality of Non-Linear Frequency Modulated (NLFM) radar signals corresponding to individual ones of the plurality of transmitters. Each of the NLFM radar signals that is generated for a respective one of the transmitters is determined based upon a desired beam steering angle and a position of the respective one of the transmit antennas of the phased array antenna.

An aspect of the disclosure includes each of the NLFM radar signals being a tansec signal that is determined in relation to the desired beam steering angle.

Another aspect of the disclosure includes the tansec signal being determined based upon an α parameter that is individually determined.

Another aspect of the disclosure includes the phased array antenna including the plurality of transmit antennas being disposed in an array and separated by a predefined distance, wherein each of the NLFM radar signals includes a tansec signal that is determined in relation to the desired beam steering angle and the predefined distance that separates the plurality of sending antennas disposed in the array.

Another aspect of the disclosure includes the transmitter controller being operatively connected to each of the plurality of transmitters Another aspect of the disclosure includes a MIMO (multiple input-multiple output) system including the plurality of transmitters and a plurality of receivers.

Another aspect of the disclosure includes the on-vehicle radar system including a plurality of receivers in communication with a receiver controller, wherein the receiver controller interacts with the plurality of receivers to receive and record a reflected radar signal.

Another aspect of the disclosure includes a signal constructor controller in communication with the receiver controller, wherein the signal constructor controller effects image formation and analysis based upon the reflected radar signal.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

The drawings are not necessarily to scale, and present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure. Furthermore, the disclosure, as illustrated and described herein, may be practiced in the absence of an element that is not specifically disclosed herein.

Figure 1:
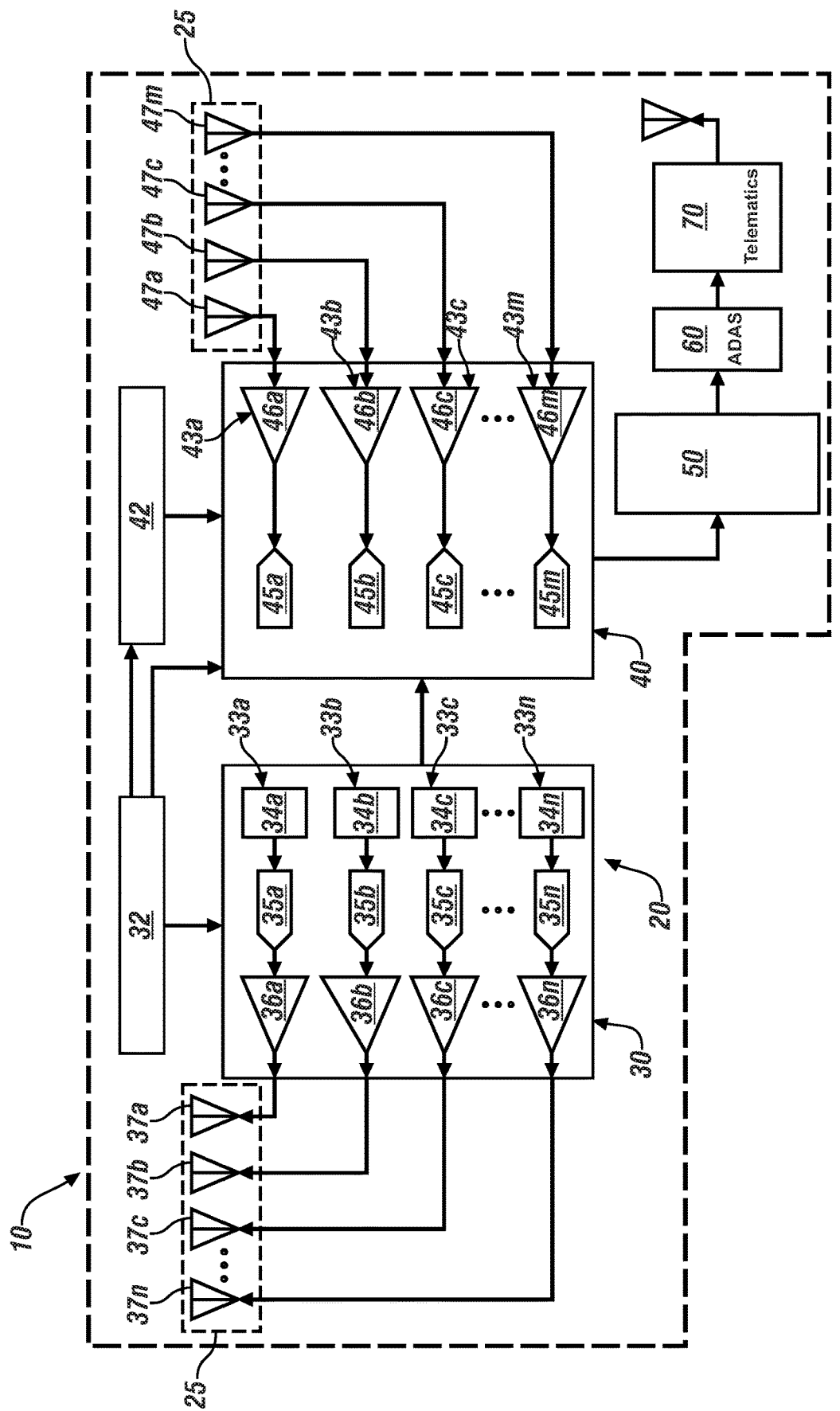
FIG. 1 schematically illustrates an on-vehicle radar system that may be disposed on a vehicle, in accordance with the disclosure.
Figure 2:
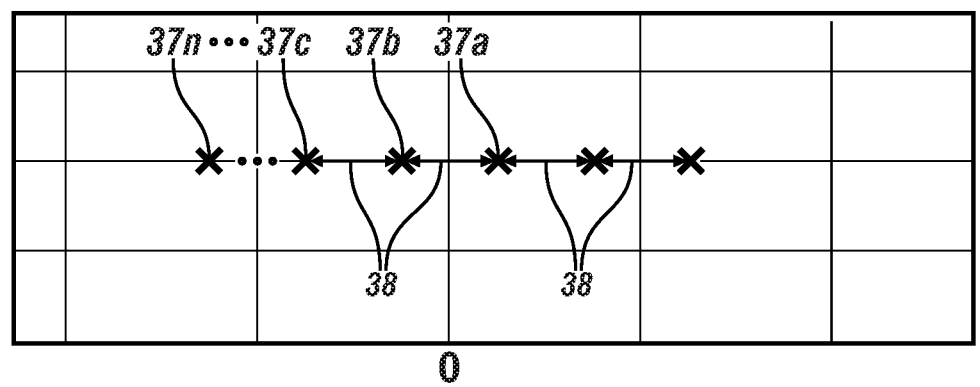
FIG. 2 schematically illustrates a front view of a phased array antenna including a plurality of transmit antennas, in accordance with the disclosure.

Referring to the drawings, wherein like reference numerals correspond to like or similar components, FIGS. 1 and 2, consistent with embodiments disclosed herein, schematically illustrate an on-vehicle radar system 20 including a phased array antenna 25 that may be disposed on a vehicle 10. The vehicle 10 may include, but not be limited to a ground vehicle in the form of a commercial vehicle, industrial vehicle, agricultural vehicle, passenger vehicle, aircraft, watercraft, train, all-terrain vehicle, personal movement apparatus, robot and the like to accomplish the purposes of this disclosure. The vehicle 10 may include an advanced driving assistance system (ADAS) 60 that provides a level of autonomous vehicle control and a telematics system 70. The on-vehicle radar system 20 provides information related to location and trajectory of vehicles, pedestrians and other objects proximal to the vehicle 10, with such information being communicated to the ADAS 60 for its use, which may include informing the operator and autonomously controlling the vehicle 10.

As employed herein, the ADAS 60 includes an on-vehicle control system that is capable of providing a level of driving automation. The 'operator' describes the person responsible for directing operation of the vehicle 10, whether actively involved in controlling one or more vehicle functions or directing autonomous vehicle operation. Driving automation can include various dynamic driving and vehicle operations. Driving automation can include some level of automatic control or intervention related to a single vehicle function, such as steering, acceleration, and/or braking, with the operator continuously having overall control of the vehicle 10. Driving automation can include some level of automatic control or intervention related to simultaneous control of multiple vehicle functions, such as steering, acceleration, and/or braking, with the operator continuously having overall control of the vehicle. Driving automation can include simultaneous automatic control of vehicle driving functions, including steering, acceleration, and braking, wherein the operator cedes control of the vehicle 10 for a period of time during a trip. Driving automation can include simultaneous automatic control of vehicle driving functions, including steering, acceleration, and braking, wherein the operator cedes control of the vehicle for an entire trip. Driving automation includes hardware and controllers configured to monitor the spatial environment under various driving modes to perform various driving tasks during dynamic operation. Driving automation can include, by way of non-limiting examples, cruise control, adaptive cruise control, lane-change warning, intervention and control, automatic parking, acceleration, braking, and the like. The ADAS 60 preferably includes one or a plurality of vehicle systems and associated controllers that provide a level of driving automation. The vehicle systems, subsystems and controllers associated with the ADAS 60 are implemented to execute one or a plurality of operations associated with autonomous vehicle functions, including, by way of non-limiting examples, an adaptive cruise control (ACC) operation, lane guidance and lane keeping operation, lane change operation, steering assist operation, object avoidance operation, parking assistance operation, vehicle braking operation, vehicle speed and acceleration operation, vehicle lateral motion operation, e.g., as part of the lane guidance, lane keeping and lane change operations, etc.

The on-vehicle radar system 20 may be configured as a multiple input/multiple output (MIMO) system that includes the phased array antenna 25, a transmitting portion 30, a receiving portion 40 and a signal constructor controller 50. The elements of the on-vehicle radar system 20 are configured to operate as a non-linear-frequency-modulated (NLFM) system. The transmit frequency and related operating parameters for the NLFM system are selected to achieve desired values for range, range resolution, angular resolution and velocity resolution for the expected operating environment of the vehicle 10. The NLFM system is arranged to generate and transmit tansec waveforms, which resolve beam skew error by compensating for additional phase variation beam skew error.

The phased array antenna 25 includes a plurality of transmit antennas 37a, 37b, 37c, . . . 37n, and a plurality of receiving antennas 47a, 47b, 47c, . . . 47m. As shown with reference to FIG. 2, the plurality of transmit antennas 37a, 37b, 37c, . . . 37n of the phased array antenna 25 are physically positioned with adjacent ones of the transmit antennas 37a, 37b, 37c, . . . 37n being separated by a predefined distance d 38.

The transmitting portion 30 of the radar system 20 includes a quantity of n transmitters 33, which are designated by numerals 33a, 33b, 33c, . . . 33n. Each of the transmitters 33a, 33b, 33c, . . . 33n includes a respective signal generator 34a, 34b, 34c, . . . 34n that is in communication with a respective digital-to-analog converter (modulator) 35a, 35b, 35c, . . . 35n that is in communication with a respective power amplifier 36a, 36b, 36c, . . . 36n, which supplies a power signal to a respective one of the transmit antennas 37a, 37b, 37c, . . . 37n. The operation of the transmitters 33a, 33b, 33c, . . . 33n is controlled by a transmitter controller 32. In one embodiment, the signal generators 34a, 34b, 34c, . . . 34n are chirp digital direct synthesizer devices. The n transmitters 33 are disposed in a common location on the vehicle 10 in one embodiment.

The receiving portion 40 includes a quantity of m receivers 43, which are designated by numerals 43a, 43b, 43c, . . . 43m. Each of the receivers 43a, 43b, 43c, . . . 43m includes a respective one of the receiving antennas 47a, 47b, 47c, . . . 47m that is in communication with a respective power amplifier 46a, 46b, 46c, . . . 46m that is in communication with a respective analog-to-digital converter 45a, 45b, 45c, . . . 45m. The operation of the receivers 43a, 43b, 43c, . . . 43m is controlled by a receiver controller 42. The m receivers 43 are disposed in a common location on the vehicle 10 in one embodiment. The m receivers 43 and the n transmitters 33 are disposed in a common location on the vehicle 10 in one embodiment.

The transmitter controller 32 communicates with each of the transmitters 33a, 33b, 33c, . . . 33n, the receiver controller 42, and in one embodiment, the receivers 43a, 43b, 43c, . . . 43m. The receiver controller 42 communicates with the receivers 43a, 43b, 43c, . . . 43m. The receivers 43a, 43b, 43c, . . . 43m communicate with the signal constructor controller 50.

The quantity of n transmitters 33 may be equal to the quantity of m receivers 43 in one embodiment. Alternatively, the quantity of n transmitters 33 may be less than the quantity of m receivers 43, or the quantity of n transmitters 33 may be greater than the quantity of m receivers 43.

The transmitter controller 32 commands timing and control of the transmitters 33a, 33b, 33c, . . . 33n to generate and transmit NLFM radar signals. The receiver controller 42 interacts with the receivers 43a, 43b, 43c, . . . 43m to receive and record a reflected radar signal, i.e., an echo signal. The signal constructor controller 50 effects image formation and analysis based upon the radar signal reception and recorded data. It also employs matched-filter to permit the received signals to be individually discernible over the series of the NLFM radar signals.

The term "controller" and related terms such as control module, module, control, control unit, processor and similar terms refer to one or various combinations of Application Specific Integrated Circuit(s) (ASIC), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired point-to-point link, a networked communication bus link, a wireless link or another suitable communication link. Communication includes exchanging data signals in suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers. The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium.

An on-vehicle radar system, such as described with reference to FIGS. 1 and 2, advantageously employs beam steering of the transmitted radar signals from the phased array antenna 25 in order to capture a field of view (FOV) forward of the vehicle 10 that is associated with a direction of travel of the vehicle 10, or another direction. The term beam steering refers to an ability to steer or direct a lobe of a radiation pattern of a transmitted radar signal in a field of view. The use of beam steering permits the phased array antenna 25 to be disposed at a fixed location on-vehicle to capture the field of view (FOV) forward of the vehicle 10. In one embodiment, the FOV is defined as being +/−30 degrees from a longitudinal axis that is defined by a direction of travel of the vehicle 10.

Figure 3:
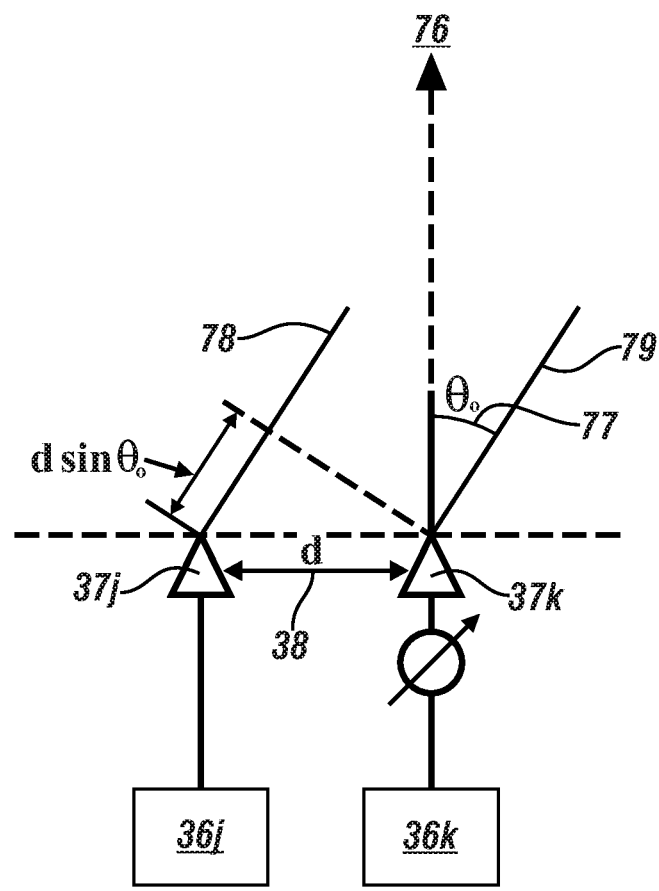
FIG. 3 schematically illustrates a phase shift between transmitted radar signals that are generated by two adjacent transmit antennas in a phased array antenna in accordance with the disclosure.

FIG. 3 schematically shows a phase shift between transmitted radar signals 78, 79 that are generated by two adjacent transmit antennas 37j and 37k, respectively, that may be elements in the phased array antenna 25 described with reference to FIGS. 1 and 2. A direction of travel 76 and a beam steering angle 77 are indicated. The adjacent transmit antennas 37j and 37k as shown are being driven by respective power amplifiers 36j, 36k to generate transmitted radar signals 78 and 79, respectively. The beam steering angle 77 is associated with beam steering of the transmitted radar signals 78, 79 that are being generated by the transmit antennas 37j and 37k. The two adjacent transmit antennas 37j and 37k are separated by distance d 38, which is analogous to the distance d 38 that is defined with reference to FIG. 2 and is defined orthogonal to the direction of travel 76. A phase shift caused by the beam steering of the beam steering angle 77 between the transmitted radar signals 78, 79 can be determined in accordance with EQ. 1, as follows:

$$\phi(t) = 2\pi \frac{d}{\lambda} \sin(\theta_0) \quad (1)$$

wherein $\phi(t)$ represents the phase shift, d represents the distance d 38, $\lambda$ represents a wavelength of the transmitted radar signal, and $\theta_0$ represents the beam steering angle 77 from an azimuth line that is defined by the direction of travel 76.

The transmitter controller 32 of the on-vehicle radar system 20 generates a plurality of NLFM radar signals corresponding to individual ones of the plurality of transmitters 33, which is transmitted via the plurality of transmit antennas 37 of the phased array antenna 25. Each of the NLFM radar signals is determined based upon a desired beam steering angle for the NLFM radar signal and a position of the respective one of the transmit antennas 37 of the phased array antenna 25. The position of the respective one of the transmit antennas 37 of the phased array antenna 25 is defined in relation to the other transmit antennas 37.

Each of the transmit antennas 37 transmits a tansec waveform having an individually-determined $\alpha$ parameter, which adds a phase correction component to mitigate beam skew between the individual elements of the transmit antennas 37. The different tansec waveforms from the individual elements of the transmit antennas 37 compensate for unwanted phase roll.

A tansec waveform may be defined as u(t), which can be determined as follows in EQ. 2:

$$u(t) = e^{j2\pi w \sec(k_1 t)/(k_1 k_2)} = e^{jK\sec(k_1 t)}$$

$$f(t) = w \tan(k_1 t)\sec(k_1 t)/k_2,$$

$$\varphi(t) = 2\pi w \sec(k_1 t)/(k_1 k_2),$$

$$w = \alpha B/\pi,$$

$$k_1 = 2 \arctan(B/2w)/T,$$

$$k_2 = \sec(k_1 T/2). \quad (2)$$

The term B represents signal bandwidth, the term T represents chirp duration, the term t represents time, and the term $\alpha$ represents the $\alpha$ parameter.

The different tansec waveforms have the same bandwidth and chirp duration in one embodiment, and differ only in the magnitude of the $\alpha$ parameter. The tansec signal time interval is $$\left[-\frac{T}{2}, 0\right],$$

with monotonically descending phase. By designing $\varphi(t)$ to be approximately equal to $-\phi(t)$, i.e., the phase angle between two adjacent individual elements of the transmit antennas 37, unwanted phase roll can be mitigated.

The $\alpha$ parameters for the tansec signals may be calculated offline and stored in a look-up table (LUT). The LUT may be generated by a three step process, which includes determining inputs, executing a loop, and calculating the $\alpha$ parameters for the tansec signals. The inputs including antenna position inputs, desired waveform inputs, and desired beam steering inputs. The inputs associated with the antenna position are related to a layout of the individual elements of the transmit antennas 37 of the phased array antenna 25, including positions and distances between adjacent ones of the transmit antennas. The inputs associated with the desired waveform include a start frequency, a stop frequency, and a chirp duration. The inputs related to the desired beam steering include a desired beam steering angle, which is associated with the FOV of the radar system 20. The aforementioned loop is executed for all configurations, which may result in generating multiple LUTs for each configuration of the phased array antenna 25.

The tansec signals are calculated during each loop for each configuration, wherein the transmitters are arranged in a 2D array with indexes (m,n), m is the row index and n is the column index associated with the plurality of transmit antennas 37a, 37b, 37c, . . . 37n of the phased array antenna 25.

Calculating the α parameters for the tansec signals includes setting element (1,1) to have a tansec signal having $\alpha_{1,1}=\infty$, which is a special case for tansec that equals an LFM signal, the loop is executed on the elements column-wise, starting with index (1,2). For each loop, the α parameter is calculated, wherein the α parameter has a value that is selected to satisfy the following condition:

$$\arg\min_{\alpha_{m,n}} \int_0^{\frac{T}{2}} |\Delta\varphi(t) + \phi(t)|^2 dt, \text{ wherein:} \quad (3)$$

$\Delta\varphi(t) =$ $\varphi_{m,n}(t) - \varphi_{m,n-1}(t)$ for a column difference in index$(m, n)$, $\Delta\varphi(t) = \varphi_{m,n}(t) - \varphi_{m-1,n}(t)$ for a row difference in index$(m, n)$, $\varphi_{m,n}(t)$ is defined by $\alpha_{m,n}$, and $\phi(t) = 2\pi \frac{d_{m,n}}{\lambda(t)} \sin(\theta_0) \cos(\psi) + 2\pi \frac{d_{m,n}}{\lambda(t)} \sin(\psi);$ and wherein $d_{m,n}$ is the predefined distance between adjacent ones of the transmit antennas.

The argmin calculation of EQ. 3 may be solved employing a one-dimensional gradient descent method to determine the desired α parameter for each of the plurality of transmit antennas 37a, 37b, 37c, . . . 37n of the phased array antenna 25. In this manner, the beam skew error may be greatly reduced as compared to a system employing an LFM system.

In operation, the transmitter controller 32 selects the α parameter for each of the plurality of transmit antennas 37a, 37b, 37c, . . . 37n of the phased-array antenna 25 based upon a desired beam steering angle for the NLFM radar signal and a position of the respective one of the plurality of transmit antennas of the phased array antenna 25.

The transmitter controller 32 employs the transmitter 33 to generate a position-specific tansec waveform for each of the plurality of transmit antennas 37a, 37b, 37c, . . . 37n of the phased array antenna 25 employing EQ. 2.

Figure 4:
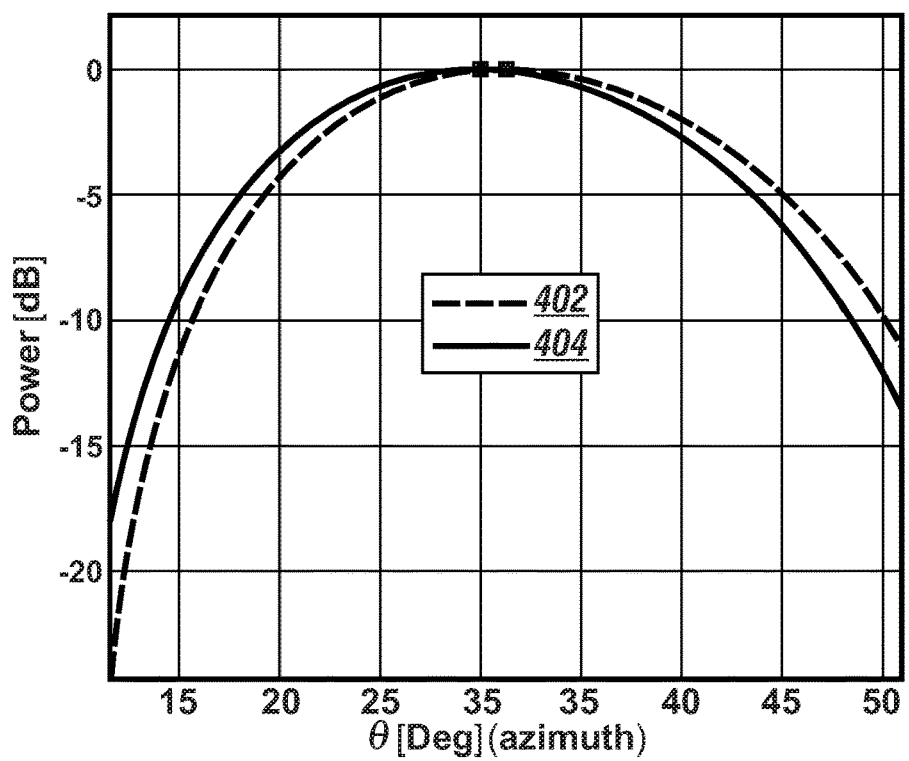
FIG. 4 graphically shows a beam steer skew error associated with operation of a phased array antenna to generate an LFM waveform, in accordance with the disclosure.

FIG. 4 graphically shows a beam steer skew error associated with operation of a phased array antenna having six transmit antennas that are separated by a predefined spacing of d=1.94 mm, and a desired beam steering angle of 30°, wherein the transmitter controller employs the transmitter to generate an LFM waveform for each of the each of the plurality of transmit antennas. As shown, the beam steering angle is indicated on the horizontal axis, and the power is indicated on the vertical axis, and the data lines represent operation at 80 GHz (Line 402) and operation at 77 GHz (Line 404). The additive phase for the LFM waveform between elements is as much as 3.5°, leading to a beam steer skew error of up to 1.3. In LFM, the wavelength, λ, changes during the chirp, which causes the beam direction to vary during the LFM transmission, resulting in beam skew. Skew limits the direction of arrival estimation accuracy, reduces the antenna gain and limits scanning capabilities.

Figure 5:
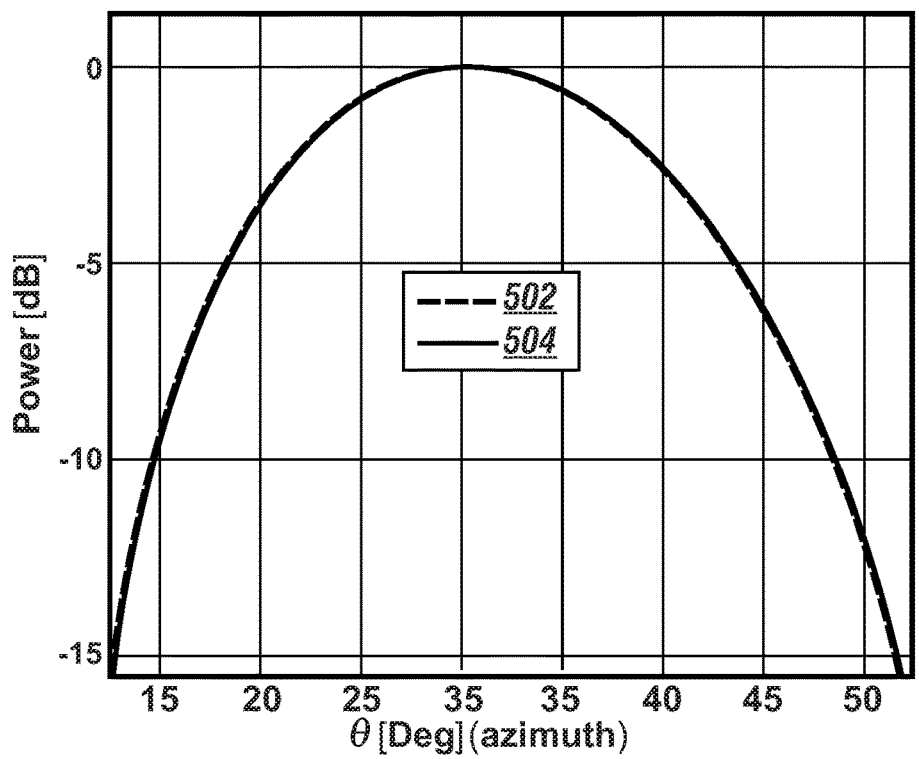
FIG. 5 graphically shows a beam steer skew error associated with operation of a phased array antenna to generate a NLFM waveform, in accordance with the disclosure.

By way of contrast and to demonstrate the operation of the system described herein, FIG. 5 graphically shows a beam steer skew error associated with operation of a phased array antenna having six transmit antennas that are separated by a predefined spacing of d=1.94 mm, and a desired beam steering angle of 30°, wherein the transmitter controller employs the transmitter to generate the NLFM waveform for each of the each of the plurality of transmit antennas in a manner described herein with reference to FIGS. 1-3. As shown, the beam steering angle is indicated on the horizontal axis, and the power is indicated on the vertical axis, and the data lines represent operation at 80 GHz (Line 502) and operation at 77 GHz (Line 504). The additive phase, for the selected tansec waveform, between elements is an order of magnitude less, leading to a negligible beam steer skew error. Thus, selection of the α parameter for the tansec waveform introduces a phase component that counters the phase roll generated by the frequency variation and mitigates beam steering skew error.

The teachings may be described herein in terms of functional and/or logical block components and/or various processing steps. Such block components may be composed of hardware, software, and/or firmware components that have been configured to perform the specified functions. Embodiments in accordance with the present disclosure may be embodied as an apparatus, method, or computer program product. Accordingly, the present disclosure may take the form of an entirely hardware embodiment, an entirely software embodiment (including firmware, resident software, micro-code, etc.), or an embodiment combining software and hardware aspects that may generally be referred to herein as a "module" or "system." Furthermore, the present disclosure may take the form of a computer program product embodied in a tangible medium of expression having computer-usable program code embodied in the medium.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:
1. An on-vehicle radar system, comprising:
a phased array antenna including a plurality of transmit antennas, and a corresponding plurality of transmitters, wherein each of the transmitters is in communication with a respective one of the transmit antennas; and
a transmitter controller, operatively connected to each of the plurality of transmitters, the transmitter controller including an instruction set, the instruction set executable to generate a plurality of Non-Linear Frequency Modulated (NLFM) radar signals corresponding to individual ones of the plurality of transmitters;
wherein each of the NLFM radar signals generated for a respective one of the transmit antennas is determined based upon a desired beam steering angle for the

NLFM radar signal and a position of the respective one of the transmit antennas of the phased array antenna.

2. The on-vehicle radar system of claim 1, wherein each of the NLFM radar signals comprises a tansec signal that is determined in relation to the desired beam steering angle.

3. The on-vehicle radar system of claim 2, further comprising the tansec signal being determined based upon an α parameter that is individually-determined based upon the desired beam steering angle for the NLFM radar signal and the position of the respective one of the plurality of transmit antennas of the phased array antenna.

4. The on-vehicle radar system of claim 1, wherein the phased array antenna including the plurality of transmit antennas includes the plurality of transmit antennas disposed in an array and separated by a predefined distance, and
wherein each of the NLFM radar signals comprises a tansec signal that is determined in relation to the desired beam steering angle and the predefined distance that separates the plurality of transmit antennas disposed in the array.

5. The on-vehicle radar system of claim 1, wherein the plurality of the NLFM radar signals have common bandwidths.

6. The on-vehicle radar system of claim 1, wherein the plurality of the NLFM radar signals have common chirp durations.

7. The on-vehicle radar system of claim 1, further comprising the transmitter controller being operatively connected to each of the plurality of transmitters via a corresponding one of a plurality of signal generators.

8. The on-vehicle radar system of claim 1, further comprising a MIMO (multiple input-multiple output) system including the plurality of transmitters and a plurality of receivers.

9. The on-vehicle radar system of claim 1, further comprising a plurality of receivers in communication with a receiver controller, wherein the receiver controller interacts with the plurality of receivers to receive and record a reflected radar signal.

10. The on-vehicle radar system of claim 9, further comprising a signal constructor controller in communication with the receiver controller, wherein the signal constructor controller effects image formation and analysis based upon the reflected radar signal.

11. An on-vehicle radar system, comprising:
a phased array antenna including a plurality of transmit antennas, and a corresponding plurality of transmitters, wherein each of the transmitters is in communication with a respective one of the transmit antennas;
a plurality of receivers in communication with a receiver controller; and
a transmitter controller, operatively connected to each of the plurality of transmitters, the transmitter controller including an instruction set, the instruction set executable to generate a plurality of Non-Linear Frequency Modulated (NLFM) radar signals corresponding to individual ones of the plurality of transmitters;
wherein each of the NLFM radar signals generated for a respective one of the transmit antennas comprises a tansec signal that is determined based upon a desired beam steering angle for the NLFM radar signal and a position of the respective one of the transmit antennas of the phased array antenna.

12. The on-vehicle radar system of claim 11, further comprising the tansec signal being determined based upon an α parameter that is individually-determined based upon the desired beam steering angle for the NLFM radar signal and the position of the respective one of the plurality of transmit antennas of the phased array antenna.

13. The on-vehicle radar system of claim 11, wherein the phased array antenna including the plurality of transmit antennas includes the plurality of transmit antennas disposed in an array and separated by a predefined distance, and
wherein each of the NLFM radar signals comprises the tansec signal that is determined in relation to the desired beam steering angle and the predefined distance that separates the plurality of transmit antennas disposed in the array.

14. The on-vehicle radar system of claim 11, wherein the plurality of NLFM radar signals have common bandwidths.

15. The on-vehicle radar system of claim 11, wherein the plurality of NLFM radar signals have common chirp durations.

16. The on-vehicle radar system of claim 11, further comprising the transmitter controller being operatively connected to each of the plurality of transmitters via a corresponding one of a plurality of signal generators.

17. The on-vehicle radar system of claim 11, further comprising a MIMO (multiple input-multiple output) system including the plurality of transmitters and a plurality of receivers.

18. The on-vehicle radar system of claim 11, wherein the receiver controller interacts with the plurality of receivers to receive and record a reflected radar signal.

19. The on-vehicle radar system of claim 18, further comprising a signal constructor controller in communication with the receiver controller, wherein the signal constructor controller effects image formation and analysis based upon the reflected radar signal.

* * * * *